United States Patent
Kondo

(10) Patent No.: US 12,130,497 B2
(45) Date of Patent: Oct. 29, 2024

(54) IMAGING LENS AND IMAGING APPARATUS

(71) Applicant: FUJIFILM Corporation, Tokyo (JP)

(72) Inventor: Masato Kondo, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 469 days.

(21) Appl. No.: 17/192,684

(22) Filed: Mar. 4, 2021

(65) Prior Publication Data

US 2021/0294073 A1    Sep. 23, 2021

(30) Foreign Application Priority Data

Mar. 17, 2020 (JP) .................. 2020-047018

(51) Int. Cl.
G02B 9/12 (2006.01)
(52) U.S. Cl.
CPC ..................... *G02B 9/12* (2013.01)
(58) Field of Classification Search
CPC .............. G02B 9/12; G02B 13/0035; G02B 15/143103; G02B 15/143107
USPC .................................. 359/791, 792
See application file for complete search history.

(56) References Cited

U.S. PATENT DOCUMENTS

| | | | |
|---|---|---|---|
| 5,640,277 A | 6/1997 | Ohshita | |
| 6,025,960 A | 2/2000 | Morooka | |
| 10,845,579 B2 | 11/2020 | Ichimura | |
| 2019/0271830 A1 | 9/2019 | Mori | |

FOREIGN PATENT DOCUMENTS

| | | |
|---|---|---|
| JP | H07-218836 A | 8/1995 |
| JP | H107-199066 A | 8/1995 |
| JP | H11-183801 A | 7/1999 |
| JP | 2016-212346 A | 12/2016 |
| JP | 2019-090919 A | 6/2019 |
| JP | 6546752 B2 | 7/2019 |
| JP | 2019-152773 A | 9/2019 |

OTHER PUBLICATIONS

Machine translation of JP H07-218836 retrieved electronically from Espacenet Aug. 16, 2023 (Year: 2023).*
Machine translation of JP6546752 retrieved electronically from PE2E Search, Mar. 15, 2024 (Year: 2024).*
An Office Action; "Notice of Reasons for Refusal," mailed by the Japanese Patent Office on Sep. 27, 2022, which corresponds to Japanese Patent Application No. 2020-047018 and is related to U.S. Appl. No. 17/192,684; with English language translation.

* cited by examiner

*Primary Examiner* — Cara E Rakowski
(74) *Attorney, Agent, or Firm* — Studebaker & Brackett PC

(57) ABSTRACT

The imaging lens consists of, in order from the object side to the image side, a first lens group having a positive refractive power, a second lens group having a positive refractive power, and a third lens group. During focusing, only the second lens group moves. The second lens group includes at least four lenses. The imaging lens satisfies predetermined conditional expressions.

16 Claims, 10 Drawing Sheets

EXAMPLE 1

EXAMPLE 3

EXAMPLE 4

IMAGING LENS AND IMAGING APPARATUS

CROSS-REFERENCE TO RELATED APPLICATIONS

The present application claims priority under 35 U.S.C. § 119 to Japanese Patent Application No. 2020-047018, filed on Mar. 17, 2020. The above application is hereby expressly incorporated by reference, in its entirety, into the present application.

BACKGROUND OF THE INVENTION

1. Field of the Invention

The present disclosure relates to an imaging lens and an imaging apparatus.

2. Description of the Related Art

Conventionally, as imaging lenses used in digital cameras and the like, the lens systems described in Japanese Patent No. 06546752, JP2019-090919A, and JP2019-152773A are known.

SUMMARY OF THE INVENTION

In recent years, there has been a demand for an inner focus type imaging lens which has a small size and has favorable optical performance.

The present disclosure has been made in view of the above circumstances, and an object of the present disclosure is to provide an inner focus type imaging lens which has a small size and has favorable optical performance, and an imaging apparatus comprising the imaging lens.

A first imaging lens according to an aspect of the present disclosure consists of, in order from an object side to an image side: a first lens group having a positive refractive power; a second lens group having a positive refractive power; and a third lens group. During focusing from an object at infinity to a closest object, only the second lens group moves, the second lens group includes at least four lenses and a stop, and assuming that a sum of a distance on an optical axis from a lens surface closest to the object side in the first lens group to a lens surface closest to the image side in the third lens group and a back focal length of a whole system at an air conversion distance is TL, a maximum image height is Y, and a focal length of the whole system in a state where the object at infinity is in focus is f, Conditional Expression (1) is satisfied, which is represented by $$4 < TL^2/(Y \times f) < 7.5 \tag{1}.$$

A second imaging lens according to an aspect of the present disclosure consists of, in order from an object side to an image side: a first lens group having a positive refractive power; a second lens group having a positive refractive power; and a third lens group. During focusing from an object at infinity to a closest object, only the second lens group moves, the second lens group includes at least four lenses, and assuming that a distance on an optical axis from a lens surface closest to the object side in the first lens group to a lens surface closest to the image side in the first lens group is G1TL, and a distance on the optical axis from the lens surface closest to the object side in the first lens group to a lens surface closest to the image side in the third lens group is Gsum, Conditional Expression (2) is satisfied, which is represented by $$0.04 < G1TL/Gsum < 0.14 \tag{2}.$$

Hereinafter, the first and second imaging lenses according to the aspects of the present disclosure are collectively referred to as an imaging lens according to the aspect of the present disclosure.

It is preferable that the first lens group includes at least one positive lens and at least one negative lens.

Further, it is preferable that the third lens group includes at least three lenses.

It is preferable that an object side surface of a lens closest to the image side in the third lens group is a concave surface. Further, it is preferable that a lens closest to the image side in the third lens group is a negative lens of which the object side surface is a concave surface.

It is preferable that a lens closest to the object side in the second lens group is a positive lens. In a case where the lens closest to the object side in the second lens group is a positive lens, assuming that a refractive index of the positive lens closest to the object side in the second lens group based at a d line is N2, it is preferable that the imaging lens according to the aspect of the present disclosure satisfies Conditional Expression (3) which is represented by $$1.6 < N2 < 2.2 \tag{3}.$$

It is preferable that the second lens group includes a stop and at least one lens arranged on the object side of the stop, and an image side surface of a lens adjacent to the object side of the stop is a concave surface.

It is preferable that the second lens group includes a stop and at least one lens arranged on the image side of the stop. Assuming that a radius of curvature of the object side surface of the lens adjacent to the image side of the stop is Rc, and a combined focal length of all lenses in the second lens group closer to the image side than the stop is f22, it is preferable that the imaging lens according to the aspect of the present disclosure satisfies Conditional Expression (4) which is represented by $$-0.7 < Rc/f22 < -0.1 \tag{4}.$$

Assuming that a focal length of the whole system in the state where the object at infinity is in focus is f, and a focal length of the first lens group is f1, it is preferable that the imaging lens according to the aspect of the present disclosure satisfies Conditional Expression (5) which is represented by $$0.02 < f/f1 < 0.3 \tag{5}.$$

It is preferable that the second lens group includes a stop and at least one lens arranged on the object side of the stop. Assuming that a focal length of the whole system in the state where the object at infinity is in focus is f, and a combined focal length of all lenses in the second lens group closer to the object side than the stop is f21, it is preferable that the imaging lens according to the aspect of the present disclosure satisfies Conditional Expression (6) which is represented by $$0.2 < f/f21 < 1 \tag{6}.$$

It is preferable that the second lens group includes a stop and at least one lens arranged on the image side of the stop. Assuming that a focal length of the whole system in the state where the object at infinity is in focus is f, and a combined focal length of all lenses in the second lens group closer to the image side than the stop is f22, it is preferable that the imaging lens according to the aspect of the present disclosure satisfies Conditional Expression (7) which is represented by $$0.4 < f/f22 < 1.5 \tag{7}$$

Assuming that a focal length of the whole system in the state where the object at infinity is in focus is f, and a focal length of the third lens group is f3, it is preferable that the imaging lens according to the aspect of the present disclosure satisfies Conditional Expression (8) which is represented by $$0 < |f/f3| < 0.3 \tag{8}$$

It is preferable that the second lens group includes at least one positive lens.

Assuming that an Abbe number of the positive lens of the second lens group based on the d line is v2p, it is preferable that the imaging lens according to the aspect of the present disclosure include at least one positive lens satisfying Conditional Expression (9) which is represented by $$70 < v2p \tag{9}$$

It is preferable that the second lens group consists of at least two sets of cemented lenses each consisting of one positive lens and one negative lens, and at least the positive lenses of the two groups of the cemented lenses in the second lens group satisfy Conditional Expression (9).

Assuming that Abbe numbers of the positive lenses and the negative lenses of the cemented lenses of the second lens group, which are cemented to each other, based on the d line are vp and vn, and a maximum value of a difference obtained by subtracting vn from vp is max(vp−vn), it is preferable that the imaging lens according to the aspect of the present disclosure include at least one positive lens satisfying Conditional Expression (10) which is represented by $$30 < \max(vp-vn) < 75 \tag{10}$$

It is preferable that an object side surface of a lens closest to the object side in the second lens group is a convex surface.

Assuming that a back focal length of the whole system at the air conversion distance is Bf, and a focal length of the whole system in a state where the object at infinity is in focus is f, it is preferable that the imaging lens according to the aspect of the present disclosure satisfies Conditional Expression (11) which is represented by $$0.1 < Bf/f < 0.5 \tag{11}$$

An imaging apparatus according to another aspect of the present disclosure comprises the imaging lens according to the aspect of the present disclosure.

In the present specification, it should be noted that the terms "consisting of ~" and "consists of ~" mean that the lens may include not only the above-mentioned elements but also lenses substantially having no refractive powers, optical elements, which are not lenses, such as a stop, a filter, and a cover glass, and mechanism parts such as a lens flange, a lens barrel, an imaging element, and a camera shaking correction mechanism.

It should be noted that, in the present specification, the term "~ group having a positive refractive power" means that the group has a positive refractive power as a whole. Similarly, the term "~ group having a negative refractive power" means that the group has a negative refractive power as a whole. The terms "a lens having a positive refractive power", "a positive lens", and "a lens with a positive power" are synonymous. The terms "a lens having a negative refractive power", "a negative lens", and "a lens with a negative power" are synonymous. The term "~lens group" is not limited to a configuration consisting of a plurality of lenses, but may consist of only one lens. The term "whole system" means an imaging lens. The term "back focal length" is a distance on the optical axis from the lens surface closest to the image side in the whole system to the image side focal position of the whole system.

The term "single lens" means one uncemented lens. Here, a compound aspheric lens (a lens in which a spherical lens and an aspheric film formed on the spherical lens are integrally formed and function as one aspheric lens as a whole) is not regarded as cemented lenses, but the compound aspheric lens is regarded as a single lens. Unless otherwise specified, the sign of refractive power, the surface shape, and the radius of curvature of a lens including an aspheric surface are considered in terms of the paraxial region. Regarding the sign of the radius of curvature, the sign of the radius of curvature of the surface convex toward the object side is positive and the sign of the radius of curvature of the surface convex toward the image side is negative.

The "focal length" used in a conditional expression is a paraxial focal length. The values used in Conditional Expressions are values in a case where the d line is used as a reference in a state where the object at infinity is in focus. The "d line", "C line", and "g line" described in this specification are emission lines. In this specification, it is assumed that the d line wavelength is 587.56 nm (nanometers), the C line wavelength is 656.27 nm (nanometers), and the g line wavelength is 435.84 nm (nanometers).

According to the present disclosure, it is possible to provide an inner focus type imaging lens, which has a small size and has favorable optical performance, and an imaging apparatus comprising the imaging lens.

DESCRIPTION OF THE PREFERRED EMBODIMENTS

Figure 1:
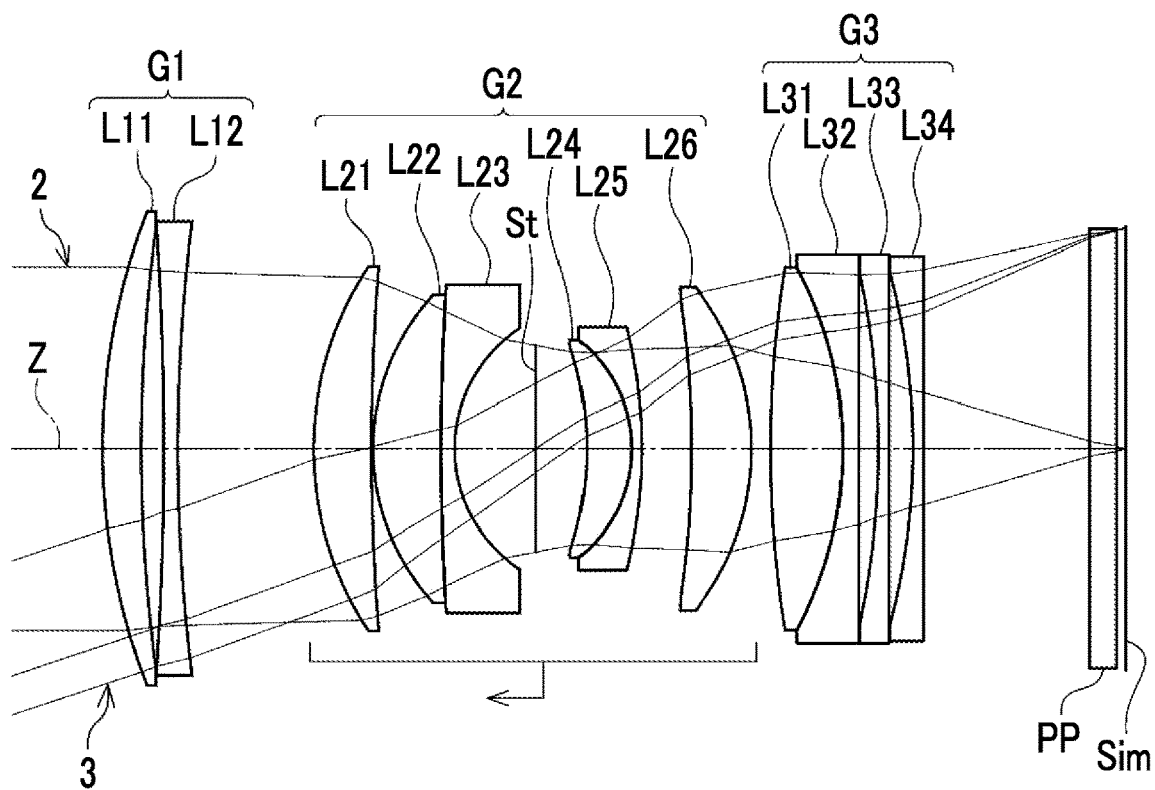
FIG. 1 is a cross-sectional view showing a configuration and rays of an imaging lens according to an embodiment.

Hereinafter, embodiments of the present disclosure will be described in detail with reference to the accompanying drawings. FIG. 1 shows a configuration and rays in a cross section including an optical axis Z of an imaging lens according to an embodiment of the present disclosure. The example shown in FIG. 1 corresponds to the imaging lens of Example 1 to be described later. In FIG. 1, the left side is the object side, the right side is the image side, and a state where an object at infinity is in focus is shown. FIG. 1 also shows on-axis rays 2 and rays with the maximum image height 3 as the rays.

FIG. 1 shows an example in which, assuming that an imaging lens is applied to an imaging apparatus, an optical member PP having a parallel plate shape is disposed between the imaging lens and the image plane Sim. The optical member PP is a member assumed to include at various filters, a cover glass, and/or the like. The various filters include, for example, a low pass filter, an infrared cut filter, and a filter that cuts a specific wavelength region. The optical member PP has no refractive power, and the optical member PP may be configured to be omitted.

The imaging lens consists of, in order from the object side to the image side along an optical axis Z, a first lens group G1 having a positive refractive power, a second lens group G2 having a positive refractive power, and a third lens group G3. The imaging lens is an inner-focus-type lens system in which only the second lens group G2 moves and the first lens group G1 and the third lens group G3 remain stationary with respect to the image plane Sim during focusing from the object at infinity to the closest object. Hereinafter, the lens group that moves during focusing is referred to as a focus group. The arrow pointing to the left below the second lens group G2 shown in FIG. 1 indicates that the second lens group G2 is a focus group and moves to the object side during focusing from the object at infinity to the closest object. By moving only the second lens group G2 and making the first lens group G1 and the third lens group G3 remain stationary during focusing, it is possible to reduce the size and weight of the focus group. In addition, it is possible to adopt a lens configuration suitable for a dust-proof and drip-proof structure.

The first lens group G1 has a positive refractive power as a whole. By forming the lens group closest to the object side as a lens group having a positive refractive power, there is an advantage in achieving reduction in total optical length.

It is preferable that the first lens group G1 includes at least one negative lens and at least one positive lens. In such a case, there is an advantage in correcting chromatic aberration.

As an example, the first lens group G1 of FIG. 1 consists of, in order from the object side to the image side, two lenses including a positive lens L11 and a negative lens L12. The lens L11 and the lens L12 in FIG. 1 are single lenses.

The second lens group G2 has a positive refractive power as a whole. Further, the second lens group G2 includes at least four lenses. In a case where the second lens group G2 includes four or more lenses, there is an advantage in suppressing fluctuation in various aberrations during focusing from the object at infinity to the closest object.

It is preferable that a lens closest to the object side in the second lens group G2 is a positive lens. In such a case, it is easy to reduce the diameter of the lens by reducing the ray diameter at a position closer to the image side than the positive lens. As a result, there is an advantage in reducing the size and weight of the focus group.

It is preferable that an object side surface of a lens closest to the object side in the second lens group G2 is a convex surface. In such a case, there is an advantage in appropriately suppressing the occurrence of spherical aberration, and there is also an advantage in appropriately correcting astigmatism and field curvature.

It is preferable that the second lens group G2 includes an aperture stop St. By disposing the aperture stop St in the second lens group G2, the symmetry of the optical system with respect to the aperture stop St is improved, and it is easy to appropriately correct various aberrations. In addition, during focusing from the object at infinity to the closest object, the second lens group G2 including the aperture stop St moves. Thereby, there is an advantage in suppressing fluctuation in various aberrations. More preferably, the second lens group G2 includes, in order from the object side to the image side, at least one lens, the aperture stop St, and at least one lens. In such a case, the symmetry of the optical system with respect to the aperture stop St is improved, and it is easier to appropriately correct various aberrations.

In a case where the second lens group G2 includes an aperture stop St, it is preferable that he second lens group G2 includes at least one lens disposed on the object side of the aperture stop St, and an image side surface of a lens adjacent to the object side of the aperture stop St is a concave surface. In such a case, there is an advantage in appropriately suppressing the occurrence of spherical aberration, and there is also an advantage in appropriately correcting astigmatism and field curvature.

It is preferable that the second lens group G2 includes at least two sets of cemented lenses each consisting of one positive lens and one negative lens. In such a case, there is an advantage in correcting chromatic aberration.

As an example, the second lens group G2 of FIG. 1 consists of, in order from the object side to the image side, a positive lens L21, a positive lens L22, a negative lens L23, an aperture stop St, a positive lens L24, a negative lens L25, and a positive lens L26. The second lens group G2 of FIG. 1 includes three lenses on each of the object side and the image side of the aperture stop St. The lens L22 and the lens L23 are cemented to each other, and the lens L24 and the lens L25 are cemented to each other. The aperture stop St of FIG. 1 does not indicate the size and shape, but indicates the position in the optical axis direction.

The third lens group G3 may have a positive refractive power as a whole, or may have a negative refractive power as a whole. Further, it is preferable that the third lens group G3 includes at least three lenses. In such a case, there is an advantage in suppressing fluctuation in various aberrations during focusing from the object at infinity to the closest object.

It is preferable that an object side surface of a lens closest to the image side in the third lens group G3 is a concave surface. In such a case, there is an advantage in correcting astigmatism.

It is preferable that a lens closest to the image side in the third lens group G3 is a negative lens having a surface concave toward the object side. In such a case, there is an advantage in improving the Petzval sum, reducing the total optical length, and correcting the distortion.

As an example, the third lens group G3 of FIG. 1 consists of, in order from the object side to the image side, four lenses including a positive lens L31, a negative lens L32, a negative lens L33, and a negative lens L34, where the lens L31 and the lens L32 are cemented to each other.

Next, a preferable configuration relating to conditional expressions will be described. However, the conditional expressions that the imaging lens preferably satisfies are not limited to the conditional expressions described in the form of the expression, and the lower limit and the upper limit are selected from the preferable and more preferable conditional expressions. The conditional expressions may include all conditional expressions obtained through optional combinations.

Assuming that a sum of a distance on the optical axis from the lens surface closest to the object side in the first lens group G1 to the lens surface closest to the image side in the third lens group G3 and a back focal length of the whole system at the air conversion distance is TL, a maximum image height is Y, and a focal length of the whole system in a state where the object at infinity is in focus is f, it is preferable that the imaging lens satisfies Conditional Expression (1). TL is the total optical length. By not allowing the corresponding value of Conditional Expression (1) to be equal to or less than the lower limit, there is an advantage in ensuring favorable optical performance, and it is easy to ensure the movable region of the focus group. As a result, there is an advantage in suppressing fluctuation in aberration during focusing. By not allowing the corresponding value of Conditional Expression (1) to be equal to or greater than the upper limit, there is an advantage in achieving reduction in size of the lens system. In particular, there is an advantage in constructing a lens system having a short total optical length with respect to the image size. In order to obtain more favorable characteristics, it is more preferable that the imaging lens satisfies at least one of Conditional Expressions (1-1) and (1-2).

$$4 < TL^2/(Y \times f) < 7.5 \quad (1)$$

$$4.5 < TL^2/(Y \times f) < 7.2 \quad (1\text{-}1)$$

$$4.5 < TL^2/(Y \times f) < 6 \quad (1\text{-}2)$$

Assuming that a distance on an optical axis from a lens surface closest to the object side in the first lens group G1 to a lens surface closest to the image side in the first lens group G1 is G1TL, and a distance on the optical axis from the lens surface closest to the object side in the first lens group G1 to a lens surface closest to the image side in the third lens group G3 is Gsum, it is preferable that the imaging lens satisfies Conditional Expression (2). By not allowing the corresponding value of Conditional Expression (2) to be equal to or less than the lower limit, it is easy to arrange the number of lenses necessary for favorable aberration correction. By not allowing the corresponding value of Conditional Expression (2) to be equal to or greater than the upper limit, it is possible to suppress an increase in the diameter of the lens of the first lens group G1 and it is easy to ensure a movable region of the focus group. As a result, there is an advantage in suppressing fluctuation in aberration during focusing. In order to obtain more favorable characteristics, it is more preferable that the imaging lens satisfies Conditional Expression (2-1).

$$0.04 < G1TL/\text{Gsum} < 0.14 \quad (2)$$

$$0.05 < G1TL/\text{Gsum} < 0.12 \quad (2\text{-}1)$$

In a configuration in which a lens closest to the object side in the second lens group G2 is a positive lens, assuming that a refractive index of the positive lens closest to the object side in the second lens group G2 based at the d line is N2, it is preferable that the imaging lens satisfies Conditional Expression (3). By not allowing the corresponding value of Conditional Expression (3) to be equal to or less than the lower limit, it is easy to reduce the diameter of the lens by reducing the ray diameter at a position closer to the image side than the positive lens closest to the object side in the second lens group G2. As a result, there is an advantage in reducing the size and weight of the focus group. By not allowing the corresponding value of Conditional Expression (3) to be equal to or greater than the upper limit, there is an advantage in suppressing fluctuation in various aberrations during focusing. In order to obtain more favorable characteristics, it is more preferable that the imaging lens satisfies Conditional Expression (3-1).

$$1.6 < N2 < 2.2 \quad (3)$$

$$1.7 < N2 < 2.1 \quad (3\text{-}1)$$

In a configuration in which the second lens group G2 includes an aperture stop St and at least one lens arranged on the image side of the aperture stop St, assuming that a radius of curvature of the object side surface of the lens adjacent to the image side of the aperture stop St is Rc, and a combined focal length of all lenses in the second lens group G2 closer to the image side than the aperture stop St is f22, it is preferable that the imaging lens satisfies Conditional Expression (4). By not allowing the corresponding value of Conditional Expression (4) to be equal to or less than the lower limit, there is an advantage in suppressing excessive correction of spherical aberration. By not allowing the corresponding value of Conditional Expression (4) to be equal to or greater than the upper limit, there is an advantage in suppressing insufficient correction of spherical aberration. In order to obtain more favorable characteristics, it is more preferable that the imaging lens satisfies Conditional Expression (4-1).

$$-0.7 < Rc/f22 < -0.1 \quad (4)$$

$$-0.6 < Rc/f22 < -0.2 \quad (4\text{-}1)$$

Assuming that a focal length of the whole system in the state where the object at infinity is in focus is f and a focal length of the first lens group G1 is f1, it is preferable that the imaging lens satisfies Conditional Expression (5). By not allowing the corresponding value of Conditional Expression (5) to be equal to or less than the lower limit, the positive refractive power of the first lens group G1 can be ensured. As a result, there is an advantage in reducing the total optical length. By not allowing the corresponding value of Conditional Expression (5) to be equal to or greater than the upper limit, there is an advantage in suppressing occurrence of chromatic aberration in the first lens group G1, and there is also an advantage in suppressing fluctuation in spherical aberration during focusing. In order to obtain more favorable characteristics, it is more preferable that the imaging lens satisfies Conditional Expression (5-1).

$$0.02 < f/f1 < 0.3 \quad (5)$$

$$0.03 < f/f1 < 0.25 \quad (5\text{-}1)$$

In a configuration in which the second lens group G2 includes an aperture stop St and at least one lens arranged on the object side of the aperture stop St, assuming that a focal length of the whole system in the state where the object at infinity is in focus is f, and a combined focal length of all lenses in the second lens group G2 closer to the object side than the aperture stop St is f21, it is preferable that the imaging lens satisfies Conditional Expression (6). By not allowing the corresponding value of Conditional Expression (6) to be equal to or less than the lower limit, it is possible to ensure the positive refractive power of the object side sub-lens group consisting of all the lenses in the second lens group G2 closer to the object side than the aperture stop St. As a result, there is an advantage in shortening the total optical length. By not allowing the corresponding value of Conditional Expression (6) to be equal to or greater than the upper limit, the positive refractive power of the object side sub-lens group is prevented from becoming excessively strong. As a result, there is an advantage in suppressing spherical aberration and astigmatism. In order to obtain more favorable characteristics, it is more preferable that the imaging lens satisfies Conditional Expression (6-1).

$$0.2 < f/f21 < 1 \tag{6}$$

$$0.3 < f/f21 < 0.7 \tag{6-1}$$

In a configuration in which the second lens group G2 includes an aperture stop St and at least one lens arranged on the image side of the aperture stop St, assuming that a focal length of the whole system in the state where the object at infinity is in focus is f, and a combined focal length of all lenses in the second lens group G2 closer to the image side than the aperture stop St is f22, it is preferable that the imaging lens satisfies Conditional Expression (7). By not allowing the corresponding value of Conditional Expression (7) to be equal to or less than the lower limit, it is possible to ensure the positive refractive power of the image side sub-lens group consisting of all the lenses in the second lens group G2 closer to the image side than the aperture stop St. As a result, there is an advantage in shortening the total optical length. By not allowing the corresponding value of Conditional Expression (7) to be equal to or greater than the upper limit, the positive refractive power of the image side sub-lens group is prevented from becoming excessively strong. As a result, there is an advantage in suppressing spherical aberration and astigmatism. In order to obtain more favorable characteristics, it is more preferable that the imaging lens satisfies Conditional Expression (7-1).

$$0.4 < f/f22 < 1.5 \tag{7}$$

$$0.5 < f/f22 < 1.2 \tag{7-1}$$

Assuming that a focal length of the whole system in the state where the object at infinity is in focus is f, and a focal length of the third lens group G3 is f3, it is preferable that the imaging lens satisfies Conditional Expression (8). Since |f/f3| is an absolute value, the lower limit thereof is 0. In a case where the imaging lens satisfies Conditional Expression (8), there is an advantage in suppressing the Petzval sum, and thus there is an advantage in suppressing an increase in field curvature. In addition, there is an advantage in suppressing fluctuation in various aberrations during focusing from the object at infinity to the closest object. In order to obtain more favorable characteristics, it is more preferable that the imaging lens satisfies Conditional Expression (8-1).

$$0 < |f/f3| < 0.3 \tag{8}$$

$$0 < |f/f3| < 0.2 \tag{8-1}$$

In a configuration in which the second lens group G2 includes at least one positive lens, assuming that an Abbe number of the positive lens of the second lens group G2 based on the d line is v2p, it is preferable that the second lens group G2 includes at least one positive lens satisfying Conditional Expression (9). In such a case, there is an advantage in correcting chromatic aberration. In order to obtain more favorable characteristics, it is more preferable that the second lens group G2 includes at least one positive lens satisfying Conditional Expression (9-1). By not allowing the corresponding value of Conditional Expression (9-1) to be equal to or greater than the upper limit, it is easy to prevent chromatic aberration from being excessively corrected.

$$70 < v2p \tag{9}$$

$$80 < v2p < 100 \tag{9-1}$$

In a configuration in which the second lens group G2 includes at least two sets of cemented lenses each consisting of one positive lens and one negative lens, it is preferable that at least the positive lenses of the two groups of the cemented lenses in the second lens group G2 satisfy Conditional Expression (9). That is, it is preferable that at least two positive lenses among the positive lenses of the plurality of the cemented lenses included in the second lens group G2 satisfy Conditional Expression (9). In a case where at least two positive lenses cemented to the negative lens satisfy Conditional Expression (9), there is an advantage in correcting chromatic aberration. More preferably, the second lens group G2 includes a positive lens of the cemented lens satisfying Conditional Expression (9) on both the object side and the image side of the aperture stop St. In order to obtain more favorable characteristics, it is more preferable that the positive lenses of at least two sets of cemented lenses in the second lens group G2 satisfy Conditional Expression (9-1).

In a configuration in which the second lens group G2 includes at least two sets of cemented lenses each consisting of one positive lens and one negative lens, assuming that Abbe numbers of the positive lenses and the negative lenses of the cemented lenses of the second lens group G2, which are cemented to each other, based on the d line are vp and vn, and a maximum value of a difference obtained by subtracting vn from vp is max(vp−vn), it is preferable that the imaging lens satisfies Conditional Expression (10). By not allowing the corresponding value of Conditional Expression (10) to be equal to or less than the lower limit, there is an advantage in appropriately correcting chromatic aberration. By not allowing the corresponding value of Conditional Expression (10) to be equal to or greater than the upper limit, it is easy to prevent chromatic aberration from being excessively corrected. In order to obtain more favorable characteristics, it is more preferable that the imaging lens satisfies Conditional Expression (10-1).

$$30 < \max(vp-vn) < 75 \tag{10}$$

$$35 < \max(vp-vn) < 65 \tag{10-1}$$

Assuming that a back focal length of the whole system at the air conversion distance is Bf, and a focal length of the whole system in a state where the object at infinity is in focus is f, it is preferable that the imaging lens satisfies Conditional Expression (11). By not allowing the corresponding value of Conditional Expression (11) to be equal to or less than the lower limit, there is an advantage in ensuring an appropriate back focal length. In particular, there is an advantage in ensuring the back focal length in a case where the imaging lens is applied as an interchangeable lens. By not allowing the corresponding value of Conditional Expression (11) to be equal to or greater than the upper limit, there is an advantage in achieving reduction in total optical length. In order to obtain more favorable characteristics, it is more preferable that the imaging lens satisfies Conditional Expression (11-1).

$$0.1 < Bf/f < 0.5 \tag{11}$$

$$0.15 < Bf/f < 0.45 \tag{11-1}$$

The following are two preferred embodiments in consideration of the above-described configurations and conditional expressions. According to a first aspect, an imaging lens consists of, in order from the object side to the image side, a first lens group G1 having a positive refractive power, a second lens group G2 having a positive refractive power, and a third lens group. During focusing from the object at infinity to the closest object, only the second lens group G2 moves, and the second lens group G2 includes at least four lenses and an aperture stop St. The imaging lens satisfies Conditional Expression (1). According to the first aspect, it is easy to realize an imaging lens which has a small size and has favorable optical performance and in which fluctuation in various aberrations is suppressed during focusing.

According to a second aspect, an imaging lens consists of, in order from the object side to the image side, a first lens group G1 having a positive refractive power, a second lens group G2 having a positive refractive power, and a third lens group. During focusing from the object at infinity to the closest object, only the second lens group G2 moves, and the second lens group G2 includes at least four lenses. The imaging lens satisfies Conditional Expression (2). According to the second aspect, it is easy to realize an imaging lens which has a small size and has favorable optical performance and in which fluctuation in various aberrations is suppressed during focusing.

The example shown in FIG. 1 is an example, and various modifications can be made without departing from the scope of the technology of the present disclosure. For example, the number of lenses constituting each lens group may be different from the number shown in FIG. 1.

Each lens group can have the following configuration, for example. The first lens group G1 may be configured to consist of, in order from the object side to the image side, a positive meniscus lens having a surface convex toward the object side, and a biconcave lens. Alternatively, the first lens group G1 may be configured to consist of, in order from the object side to the image side, a biconcave lens, and a positive meniscus lens having a surface convex toward the object side.

The second lens group G2 may be configured to consist of, in order from the object side to the image side: a positive meniscus lens having a surface convex toward the object side; a cemented lens in which a positive meniscus lens having a surface convex toward the object side and a negative meniscus lens having a surface convex toward the object side are cemented in order from the object side; an aperture stop St; a cemented lens in which a positive meniscus lens having a surface concave toward the object side and a negative meniscus lens having a surface concave toward the object side are cemented in order from the object side; and a positive lens having a surface convex toward the image side. Alternatively, the second lens group G2 may be configured to consist of, in order from the object side to the image side: a biconvex lens; a cemented lens in which a positive meniscus lens having a surface convex toward the object side and a negative meniscus lens having a surface convex toward the object side are cemented in order from the object side; an aperture stop St; a cemented lens in which a positive meniscus lens having a surface concave toward the object side and a biconvex lens are cemented in order from the object side; and two biconvex lenses.

The third lens group G3 may be configured to consist of, in order from the object side to the image side: a cemented lens in which a biconvex lens and a negative lens having a surface concave toward the object side are cemented in order from the object side; and two negative lenses each having a surface concave toward the object side. Alternatively, the third lens group G3 consists of, in order from the object side to the image side: a cemented lens in which a biconvex lens and a negative lens having a surface concave toward the object side are cemented in order from the object side; and a negative meniscus lens having a surface concave toward the object side.

The above-mentioned preferred configurations and available configurations including the configurations relating to the conditional expressions may be any combination, and it is preferable to optionally adopt the configurations in accordance with required specification.

Next, examples of the imaging lens of the present disclosure will be described.

Example 1

Figure 2:
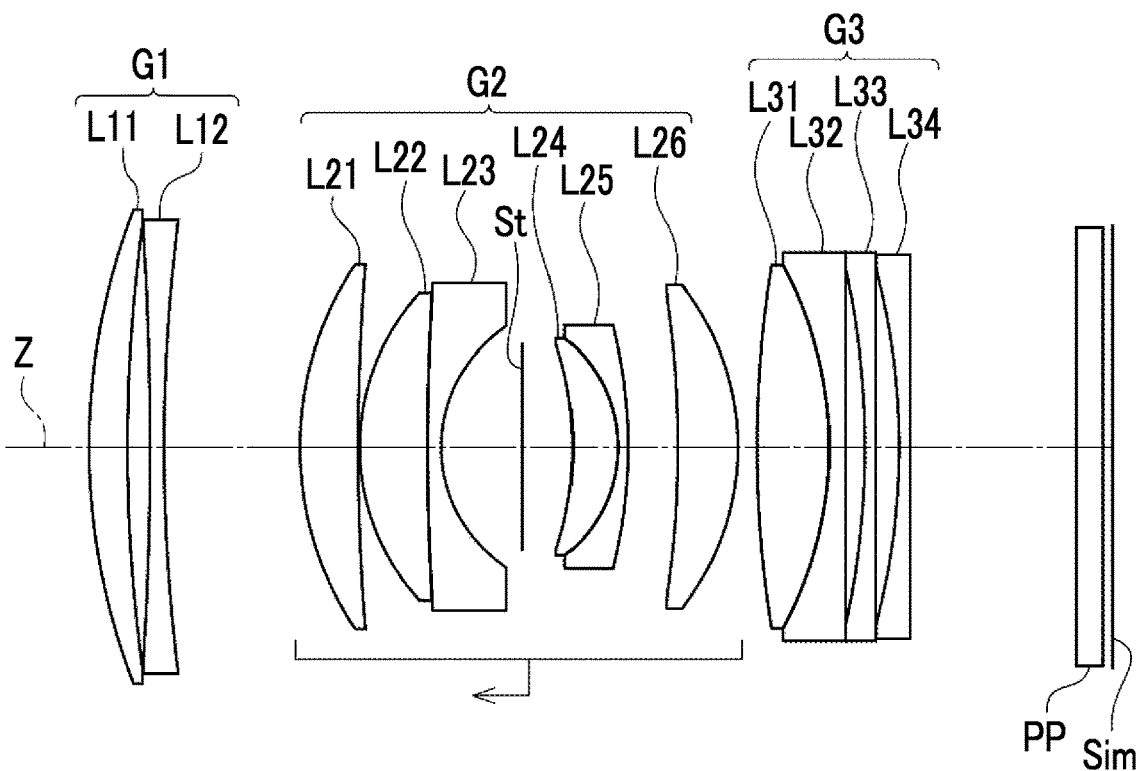
FIG. 2 is a cross-sectional view showing a configuration of an imaging lens of Example 1.

FIG. 2 is a cross-sectional view showing a configuration of the imaging lens of Example 1. FIG. 2 shows a state in which the object at infinity is in focus. FIG. 2 is different from FIG. 1 in that the rays are not shown, but the illustration method in the other points is basically the same as that in FIG. 1.

The imaging lens of Example 1 consists of, in order from the object side to the image side, a first lens group G1 having a positive refractive power, a second lens group G2 having a positive refractive power, and a third lens group G3 having a positive refractive power. The first lens group G1 consists of two lenses L11 and L12, in order from the object side to the image side. The second lens group G2 consists of three lenses L21 to L23, an aperture stop St, and three lenses L24 to L26, in this order from the object side to the image side. The third lens group G3 consists of four lenses L31 to L34 in order from the object side to the image side. During focusing from the object at infinity to the closest object, only the second lens group G2 moves to the object side, and the first lens group G1 and the third lens group G3 remain stationary with respect to the image plane Sim. The outline of the imaging lens of Example 1 has been described above.

Regarding the imaging lens of Example 1, Table 1 shows basic lens data, Table 2 shows specification, Table 3 shows variable surface distance, and Table 4 shows aspheric surface coefficients thereof. In Table 1, the column of Sn shows surface numbers. The surface closest to the object side is the first surface, and the surface numbers increase one by one toward the image side. The column of R shows radii of curvature of the respective surfaces. The column of D shows surface distances on the optical axis between the respective surfaces and the surfaces adjacent to the image side. The column of Nd shows refractive indices of the respective components at the d line. The column of vd shows Abbe numbers of the respective components based on the d line.

In Table 1, the sign of the radius of curvature of the surface convex toward the object side is positive and the sign of the radius of curvature of the surface convex toward the image side is negative. Table 1 also shows the aperture stop St and the optical member PP. In a place of a surface number of a surface corresponding to the aperture stop St, the surface number and a term of (St) are noted. A value at the bottom place of D in Table 1 indicates a distance between the image plane Sim and the surface closest to the image side in the table. In Table 1, the symbol DD[] is used for each variable surface distance that varies during focusing, and the object side surface number of the distance is given in [] and is noted in the column D.

Table 2 shows values of the focal length f, the back focal length Bf at the air conversion distance, the F number FNo., the maximum total angle of view 2ω, the maximum image height Y, and the total optical length TL. The total optical length is a sum of a distance on an optical axis from a lens surface closest to the object side in the first lens group G1 to a lens surface closest to the image side in the third lens group and a back focal length of the whole system at the air conversion distance. (°) in the place of 2ω indicates that the unit thereof is a degree. The values shown in Table 2 are values in the case of using the d line as a reference in a state where the object at infinity is in focus.

Table 3 shows the values of the variable surface distance. In Table 3, the values in a case where the object distance is a distance to the object at infinity and 700 mm (millimeter) are shown in columns labeled "infinity" and "700 mm", respectively. The object distance described herein is the distance on the optical axis from the object to the image plane Sim.

In Table 1, the reference sign * is attached to surface numbers of aspheric surfaces, and numerical values of the paraxial radius of curvature are written into the column of the radius of curvature of the aspheric surface. In Table 4, the row of Sn shows surface numbers of the aspheric surfaces, and the rows of KA and Am shows numerical values of the aspheric surface coefficients for each aspheric surface. It should be noted that m is an integer of 3 or more, and differs depending on the surface. For example, in the aspheric surface of Example 1, m=3, 4, 5, . . . , 20. The "E±n" (n: an integer) in numerical values of the aspheric surface coefficients of Table 4 indicates "×10$^{±n}$". KA and Am are the aspheric surface coefficients in the aspheric surface expression represented by the following expression.

$$Zd = C \times h^2 / \{1 + (1 - KA \times C^2 \times h^2)^{1/2}\} + \Sigma Am \times h^m$$

Here,

Zd is an aspheric surface depth (a length of a perpendicular from a point on an aspheric surface at height h to a plane that is perpendicular to the optical axis Z in contact with the vertex of the aspheric surface), h is a height (a distance from the optical axis Z to the lens surface), C is an inverse of the paraxial radius of curvature, KA and Am are aspheric surface coefficients, and Σ in the aspheric surface expression means the sum with respect to m.

In data of each table, a degree is used as a unit of an angle, and mm (millimeter) is used as a unit of a length, but appropriate different units may be used since the optical system can be used even in a case where the system is enlarged or reduced in proportion. Each of the following tables shows numerical values rounded off to predetermined decimal places.

TABLE 1

Example 1

| Sn | R | D | Nd | vd |
|---|---|---|---|---|
| 1 | 82.3255 | 4.6600 | 1.79952 | 42.25 |
| 2 | 206.9226 | 2.7500 | | |
| 3 | −420.0742 | 1.6800 | 1.72825 | 28.31 |
| 4 | 227.5627 | DD[4] | | |
| 5 | 41.3284 | 7.0200 | 1.75500 | 52.34 |
| 6 | 285.6388 | 0.2000 | | |
| 7 | 28.5038 | 8.2100 | 1.43875 | 94.66 |
| 8 | 329.0440 | 1.6300 | 1.57099 | 50.80 |
| 9 | 17.9857 | 9.8099 | | |
| 10(St) | ∞ | 6.0118 | | |
| 11 | −40.9786 | 5.4200 | 1.43875 | 94.66 |
| 12 | −17.3114 | 1.2000 | 1.67270 | 32.18 |
| 13 | −62.5410 | 6.0100 | | |
| *14 | −146.6394 | 7.2600 | 1.81000 | 41.00 |
| *15 | −33.0799 | DD[15] | | |
| 16 | 145.6170 | 8.6700 | 1.88300 | 39.22 |

TABLE 1-continued

Example 1

| Sn | R | D | Nd | vd |
|---|---|---|---|---|
| 17 | −48.3190 | 1.9400 | 1.59270 | 35.31 |
| 18 | ∞ | 2.3300 | | |
| 19 | −105.4941 | 1.3000 | 1.51680 | 64.21 |
| 20 | ∞ | 2.8900 | | |
| 21 | −86.5553 | 1.3000 | 1.64769 | 33.84 |
| 22 | ∞ | 20.1247 | | |
| 23 | ∞ | 3.2000 | 1.51680 | 64.20 |
| 24 | ∞ | 1.0500 | | |

TABLE 2

Example 1

| | |
|---|---|
| f | 78.68 |
| Bf | 23.28 |
| FNo. | 1.75 |
| 2ω(°) | 38.0 |
| Y | 27.35 |
| TL | 122.24 |

TABLE 3

Example 1

| | DD[4] | DD[15] |
|---|---|---|
| Infinity | 16.3400 | 2.3200 |
| 700 mm | 1.9320 | 16.7280 |

TABLE 4

Example 1

| Sn | 14 | 15 |
|---|---|---|
| KA | 1.0000000E+00 | 1.0000000E+00 |
| A3 | 0.0000000E+00 | 0.0000000E+00 |
| A4 | −1.0088242E−06 | 1.3965451E−07 |
| A5 | −2.6513493E−07 | −2.3150181E−07 |
| A6 | 1.7071672E−08 | 1.5432308E−08 |
| A7 | 8.2564362E−10 | 4.7477332E−10 |
| A8 | −1.0054449E−12 | −8.1934546E−11 |
| A9 | −1.7643417E−11 | −8.2435003E−13 |
| A10 | 6.0868319E−13 | 1.5740720E−13 |
| A11 | 4.7629976E−14 | 1.2547704E−14 |
| A12 | 1.3561314E−17 | −9.8161787E−16 |
| A13 | −1.9007385E−16 | −1.6440179E−17 |
| A14 | 5.4134773E−18 | 3.9921882E−18 |
| A15 | −6.3292092E−19 | −7.9972791E−20 |
| A16 | 6.8084206E−21 | −7.0611745E−21 |
| A17 | 4.8308631E−21 | 1.5944044E−22 |
| A18 | −1.8685654E−22 | 3.8876927E−24 |
| A19 | −3.6580337E−24 | 5.0171611E−25 |
| A20 | 1.8806460E−25 | −2.1180317E−26 |

Figure 3:
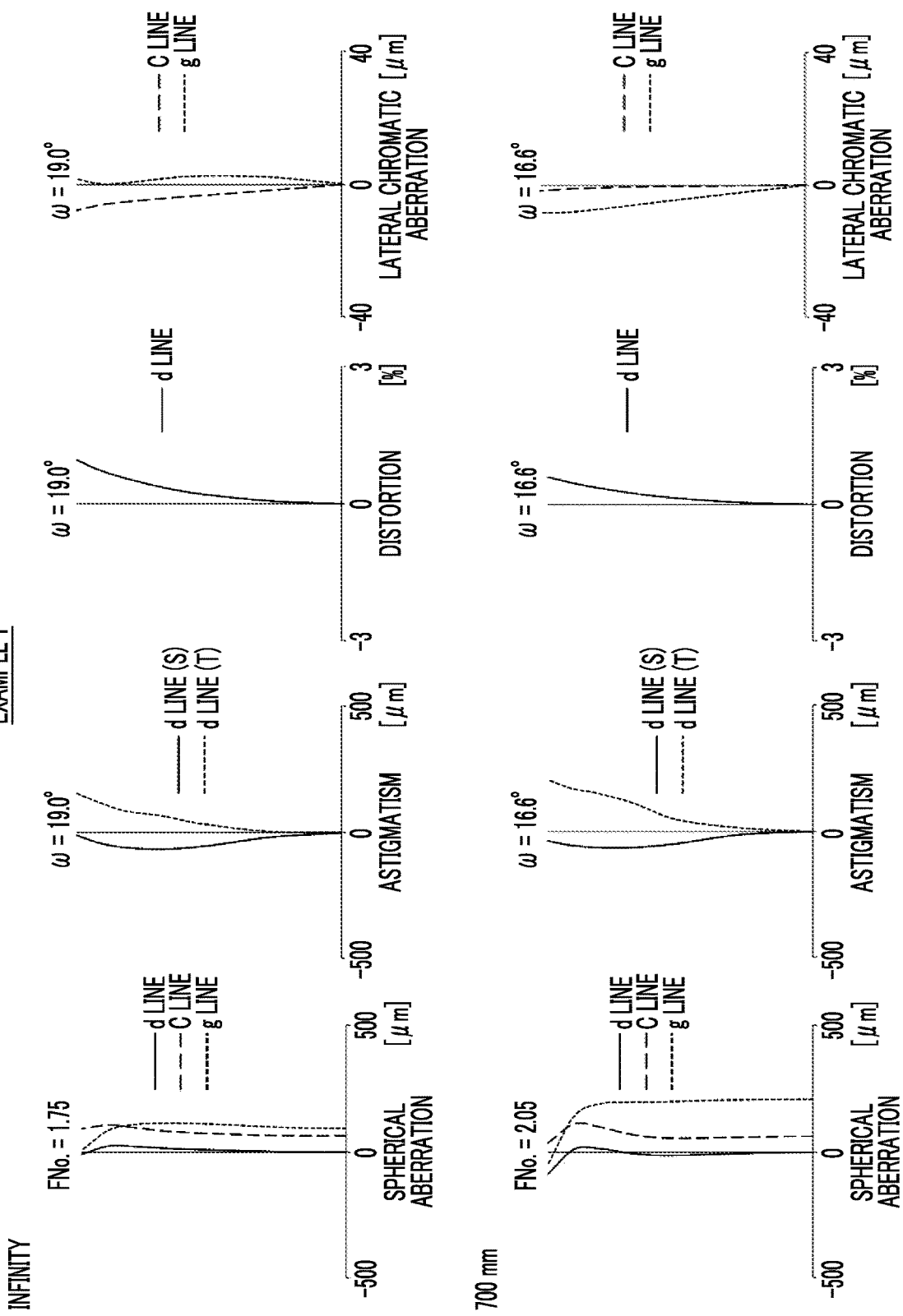
FIG. 3 is a diagram showing aberrations of the imaging lens of Example 1.

FIG. 3 shows a diagram of aberrations of the imaging lens of Example 1. In FIG. 3, in order from the left side, spherical aberration, astigmatism, distortion, and lateral chromatic aberration are shown. FIG. 3 shows aberration diagrams in a state where the object at infinity is in focus in the upper part labeled "infinity", and shows aberration diagrams in a state where the object at the object distance of 700 mm (millimeter) is in focus in the lower part labeled "700 mm". In spherical aberration diagram, aberrations at the d line, the C line, and the g line are indicated by the solid line, the long dashed line, and the short dashed line, respectively. In the astigmatism diagram, aberration in the sagittal direction at the d line is indicated by the solid line, and aberration in the tangential direction at the d line is indicated by the short dashed line. In the distortion diagram, aberration at the d line is indicated by the solid line. In lateral chromatic aberration diagram, aberrations at the C line, and the g line are respectively indicated by the long dashed line, and the short dashed line. In spherical aberration diagram, FNo. indicates an F number. In the other aberration diagrams, ω indicates a half angle of view. FIG. 3 also shows values of the FNo. and ω corresponding to the vertically upper part of each diagram.

Symbols, meanings, description methods, and illustration methods of the respective data pieces according to Example 1 are the same as those in the following examples unless otherwise specified. Therefore, in the following description, repeated description will be omitted.

Example 2

Figure 4:
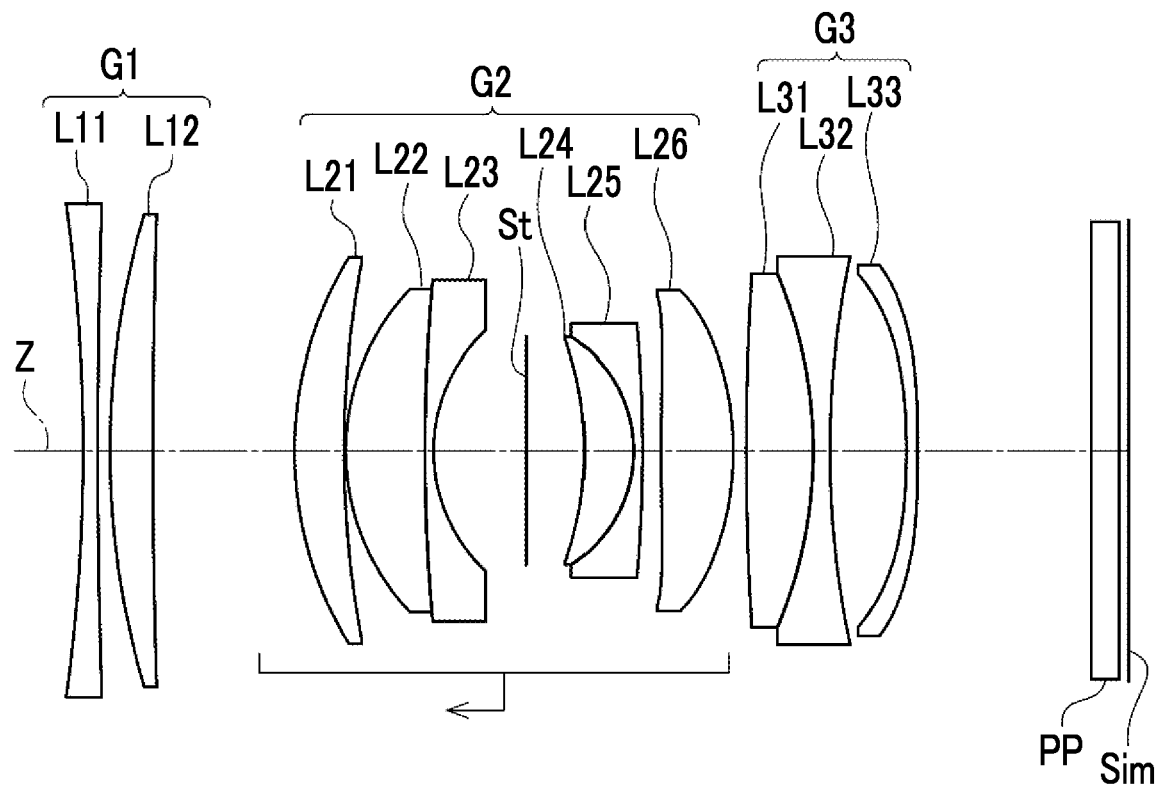
FIG. 4 is a cross-sectional view showing a configuration of an imaging lens of Example 2.
Figure 5:
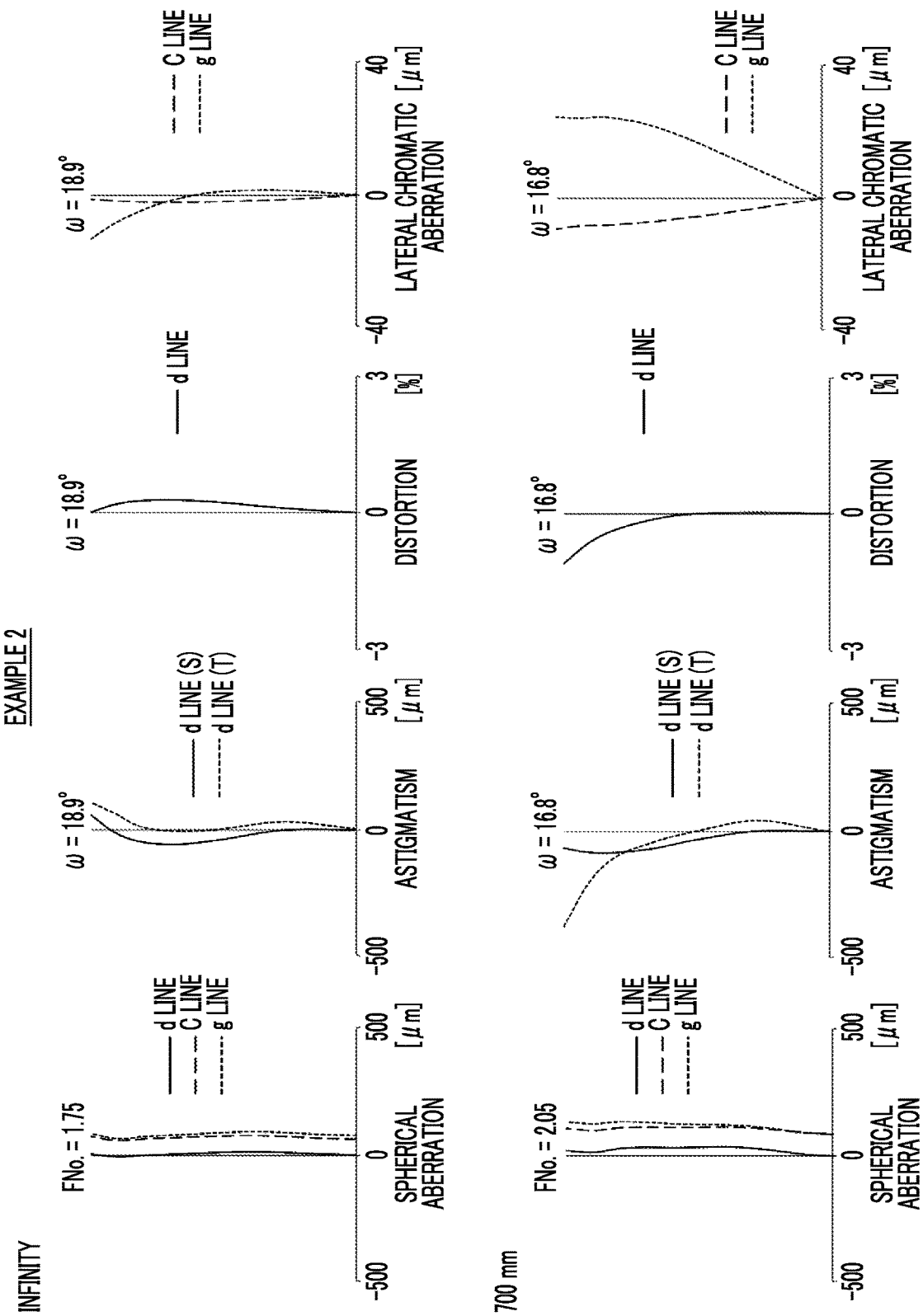
FIG. 5 is a diagram showing aberrations of the imaging lens of Example 2.

FIG. 4 is a cross-sectional view showing a configuration of the imaging lens of Example 2. The imaging lens of Example 2 has the same configuration as the outline of the imaging lens of Example 1 except that the third lens group G3 consists of three lenses including the lens L31 to the lens L33, in order from the object side to the image side. Regarding the imaging lens of Example 2, Table 5 shows basic lens data, Table 6 shows specification, Table 7 shows variable surface distances, Table 8 shows aspheric surface coefficients thereof, and FIG. 5 shows aberration diagrams. FIG. 5 shows aberration diagrams in a state where the object at infinity is in focus in the upper part, and shows aberration diagrams in a state where the object at the object distance of 700 mm (millimeter) is in focus in the lower part.

TABLE 5

Example 2

| Sn | R | D | Nd | vd |
|---|---|---|---|---|
| 1 | −218.1174 | 1.6800 | 1.83819 | 20.98 |
| 2 | 862.8611 | 1.4217 | | |
| 3 | 100.6136 | 4.9999 | 1.81298 | 46.70 |
| 4 | 914.3003 | DD[4] | | |
| 5 | 44.8833 | 5.7211 | 2.05090 | 26.94 |
| 6 | 123.1683 | 0.2000 | | |
| 7 | 28.4030 | 9.1602 | 1.43875 | 94.66 |
| 8 | 227.5893 | 1.0000 | 1.72440 | 28.27 |
| 9 | 19.9563 | 10.7500 | | |
| 10(St) | ∞ | 6.6910 | | |
| 11 | −40.4112 | 5.6250 | 1.43875 | 94.66 |
| 12 | −16.3406 | 1.0098 | 1.47999 | 58.05 |
| 13 | −175.0160 | 2.1731 | | |
| *14 | 348.9452 | 8.3250 | 1.68532 | 57.23 |
| *15 | −37.6856 | DD[15] | | |
| 16 | 343.1297 | 7.7500 | 1.88300 | 39.22 |
| 17 | −54.9467 | 1.9300 | 1.59270 | 35.31 |
| 18 | 114.5880 | 8.8751 | | |
| *19 | −88.6792 | 1.3000 | 1.51680 | 64.20 |
| *20 | −250.0222 | 20.0971 | | |
| 21 | ∞ | 3.2000 | 1.51680 | 64.20 |
| 22 | ∞ | 1.0708 | | |

TABLE 6

Example 2

| | |
|---|---|
| f | 80.09 |
| Bf | 23.28 |
| FNo. | 1.75 |

TABLE 6-continued

Example 2

| | |
|---|---|
| 2ω(°) | 37.8 |
| Y | 27.35 |
| TL | 119.76 |

TABLE 7

Example 2

| | DD[4] | DD[15] |
|---|---|---|
| Infinity | 16.3700 | 1.5000 |
| 700 mm | 4.0688 | 13.8012 |

TABLE 8

Example 2

| Sn | 14 | 15 |
|---|---|---|
| KA | 1.0000000E+00 | 1.0000000E+00 |
| A3 | 0.0000000E+00 | 0.0000000E+00 |
| A4 | −3.3341899E−06 | −5.4670280E−07 |
| A5 | −3.5284692E−07 | −4.3175175E−07 |
| A6 | 2.4789455E−08 | 2.5720606E−08 |
| A7 | 2.1033099E−10 | −2.5715428E−11 |
| A8 | −1.8944595E−11 | −4.0127217E−11 |
| A9 | −1.5705848E−11 | −5.4415585E−12 |
| A10 | 5.4537854E−13 | 2.3112777E−13 |
| A11 | 5.2372366E−14 | 1.1952014E−14 |
| A12 | 4.1000990E−16 | −5.3976159E−16 |
| A13 | −2.2801458E−16 | 3.6744505E−19 |
| A14 | 3.3648748E−18 | 2.9682650E−18 |
| A15 | −5.4359920E−19 | −1.5996152E−19 |
| A16 | 7.8226914E−21 | −1.0065782E−20 |
| A17 | 4.6683964E−21 | 1.4335940E−22 |
| A18 | −1.8579452E−22 | 2.0085964E−23 |
| A19 | −1.8661223E−24 | 1.4351292E−24 |
| A20 | 1.0896918E−25 | −7.8554648E−26 |

| Sn | 19 | 20 |
|---|---|---|
| KA | 1.0000000E+00 | 1.0000000E+00 |
| A4 | −2.5070177E−05 | −2.4232978E−05 |
| A6 | 4.2675044E−08 | 4.3430575E−08 |
| A8 | −5.1611035E−11 | −5.6962022E−11 |
| A10 | 2.0533147E−15 | 1.6367093E−14 |

Example 3

Figure 6:
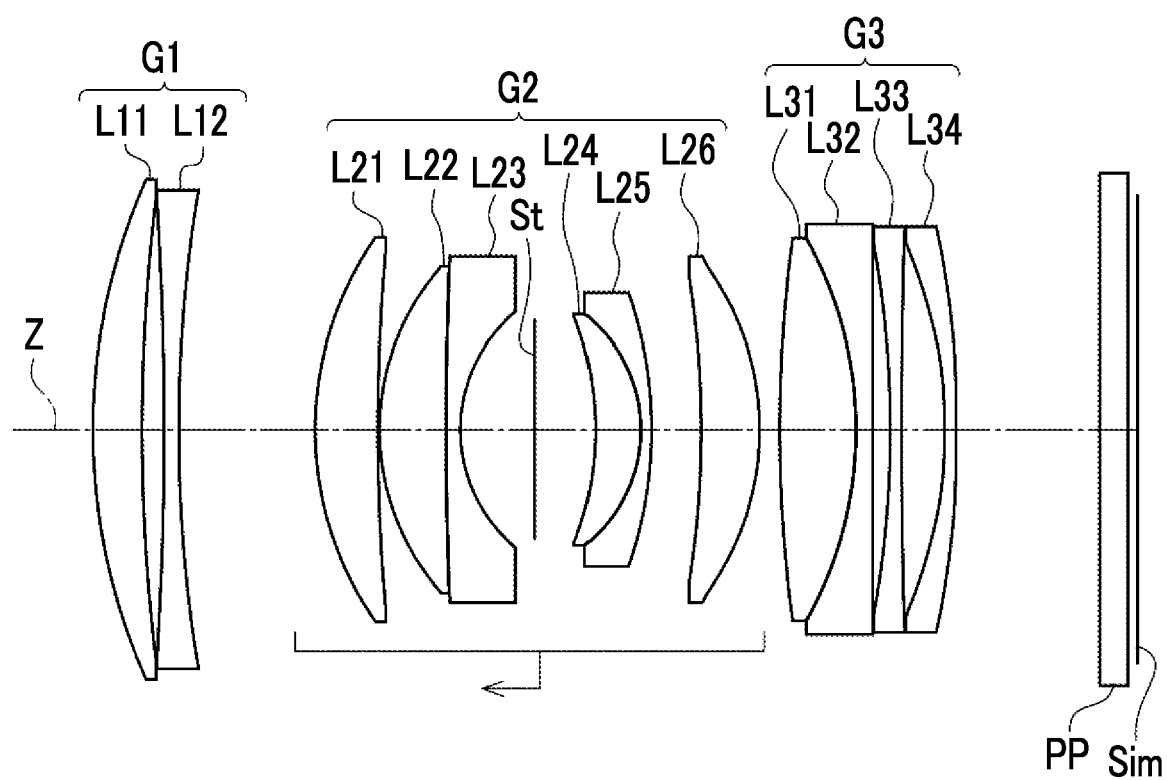
FIG. 6 is a cross-sectional view showing a configuration of an imaging lens of Example 3.
Figure 7:
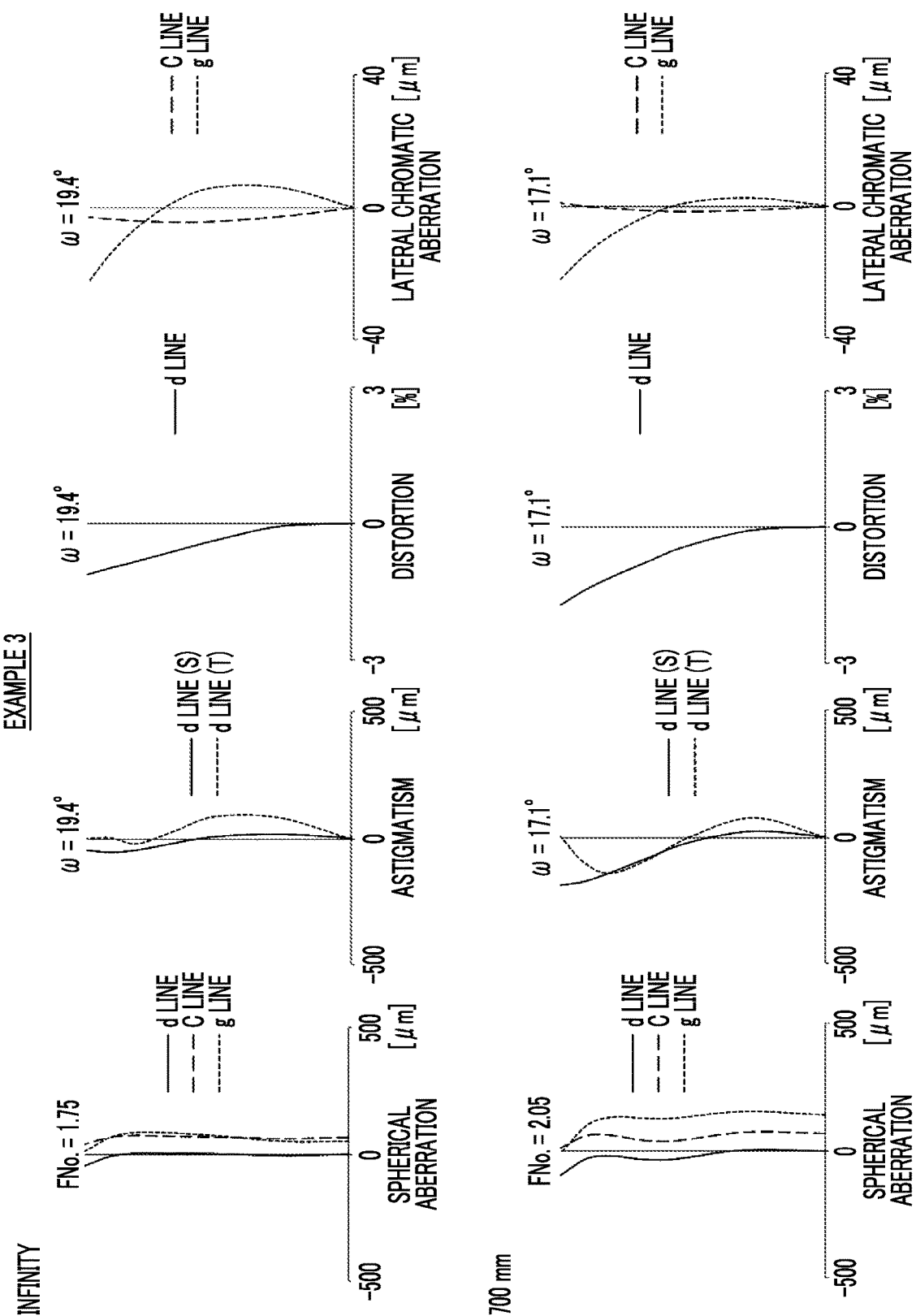
FIG. 7 is a diagram showing aberrations of the imaging lens of Example 3.

FIG. 6 is a cross-sectional view showing a configuration of the imaging lens of Example 3. The imaging lens of Example 3 has the same configuration as the outline of the imaging lens of Example 1. Regarding the imaging lens of Example 3, Table 9 shows basic lens data, Table 10 shows specification, Table 11 shows variable surface distances, Tables 12A and 12B show aspheric surface coefficients thereof, and FIG. 7 shows aberration diagrams. FIG. 7 shows aberration diagrams in a state where the object at infinity is in focus in the upper part, and shows aberration diagrams in a state where the object at the object distance of 700 mm (millimeter) is in focus in the lower part.

TABLE 9

Example 3

| Sn | R | D | Nd | νd |
|---|---|---|---|---|
| *1 | 73.4849 | 5.6356 | 1.79952 | 42.25 |
| 2 | 229.4959 | 2.5217 | | |
| 3 | −438.5951 | 1.6800 | 1.74077 | 27.76 |
| 4 | 176.1213 | DD[4] | | |
| *5 | 40.2987 | 7.1498 | 1.75500 | 52.34 |
| *6 | 246.8313 | 0.2000 | | |
| 7 | 29.4118 | 7.5957 | 1.43875 | 94.66 |
| 8 | 483.4326 | 1.6300 | 1.57099 | 50.80 |
| 9 | 18.2710 | 8.5255 | | |
| 10(St) | ∞ | 6.8606 | | |
| 11 | −37.6461 | 5.1552 | 1.43875 | 94.66 |
| 12 | −17.5652 | 1.2200 | 1.67270 | 32.18 |
| 13 | −49.9998 | 5.6627 | | |
| *14 | −129.5016 | 6.6782 | 1.81000 | 41.00 |
| *15 | −33.8703 | DD[15] | | |
| 16 | 171.0236 | 8.7121 | 1.88300 | 39.22 |
| 17 | −46.9271 | 1.9350 | 1.59270 | 35.31 |
| 18 | ∞ | 1.9730 | | |
| 19 | −125.1330 | 1.3000 | 1.51680 | 64.20 |
| 20 | 735.3274 | 4.9507 | | |
| *21 | −83.3308 | 1.3000 | 1.64769 | 33.84 |
| *22 | 5447.9941 | 16.4421 | | |
| 23 | ∞ | 3.2000 | 1.51680 | 64.20 |
| 24 | ∞ | 1.0500 | | |

TABLE 10

Example 3

| | |
|---|---|
| f | 78.68 |
| Bf | 19.60 |
| FNo. | 1.75 |
| 2ω(°) | 38.8 |
| Y | 27.35 |
| TL | 118.19 |

TABLE 11

Example 3

| | DD[4] | DD[15] |
|---|---|---|
| Infinity | 15.5748 | 2.3000 |
| 700 mm | 1.9413 | 15.9335 |

TABLE 12A

Example 3

| Sn | 1 | 5 | 6 |
|---|---|---|---|
| KA | 1.0000000E+00 | 1.0000000E+00 | 1.0000000E+00 |
| A3 | 0.0000000E+00 | 0.0000000E+00 | 0.0000000E+00 |
| A4 | 5.8147392E−08 | 6.6938462E−07 | 8.0538442E−07 |
| A5 | −1.4825586E−08 | −5.604344E−08 | −9.5489701E−08 |
| A6 | 1.0908357E−09 | 7.4883121E−10 | 2.7580974E−09 |
| A7 | −1.8829404E−11 | 3.3111264E−12 | 6.5655872E−11 |
| A8 | −6.4883790E−13 | 6.3887262E−12 | 3.1276358E−12 |
| A9 | 2.8958803E−14 | −3.3222385E−13 | −4.9487224E−13 |
| A10 | −2.9525379E−16 | 4.0516547E−15 | 1.0242324E−14 |

| Sn | 14 | 15 |
|---|---|---|
| KA | 1.0000000E+00 | 1.0000000E+00 |
| A3 | 0.0000000E+00 | 0.0000000E+00 |
| A4 | −1.0644494E−06 | 1.3717110E−06 |
| A5 | −3.6017804E−07 | −5.3112154E−07 |
| A6 | 3.2032549E−08 | 3.5119920E−08 |
| A7 | 6.8928613E−10 | 2.8461265E−10 |

TABLE 12A-continued

Example 3

| A8 | −7.8457827E−11 | −6.9980263E−11 |
|---|---|---|
| A9 | −1.7682627E−11 | −3.9507175E−12 |
| A10 | 8.5844447E−13 | 1.7906133E−13 |
| A11 | 5.8591172E−14 | 1.3535812E−14 |
| A12 | −3.0095799E−16 | −3.7931968E−16 |
| A13 | −2.1621120E−16 | −1.9856162E−17 |
| A14 | 4.3913697E−18 | 2.8581812E−18 |
| A15 | −6.9079727E−19 | −6.4812430E−20 |
| A16 | 7.3825370E−21 | −7.9068628E−21 |
| A17 | 5.0044650E−21 | 9.2658788E−23 |
| A18 | −1.7088563E−22 | 4.4664970E−24 |
| A19 | −3.4569432E−24 | 7.5449195E−25 |
| A20 | 1.4963998E−25 | −2.2407097E−26 |

TABLE 12B

Example 3

| Sn | 21 | 22 |
|---|---|---|
| KA | 1.0000000E+00 | 1.0000000E+00 |
| A3 | 0.0000000E+00 | 0.0000000E+00 |
| A4 | −6.6321548E−05 | −6.8790465E−05 |
| A5 | 4.9514285E−06 | 5.2801984E−06 |
| A6 | −7.0543852E−08 | −1.1443187E−07 |
| A7 | −2.9942679E−09 | −5.5371144E−10 |
| A8 | 5.5956776E−11 | −5.0366166E−12 |
| A9 | 1.1091435E−12 | 1.2598300E−12 |
| A10 | −1.9074734E−14 | 2.8934956E−15 |
| A11 | 8.1566810E−16 | 1.3556599E−15 |
| A12 | −3.2897952E−17 | −1.7693891E−17 |
| A13 | −7.5334927E−19 | −4.4463708E−18 |
| A14 | 3.1795836E−20 | 1.1057058E−19 |

Example 4

Figure 8:
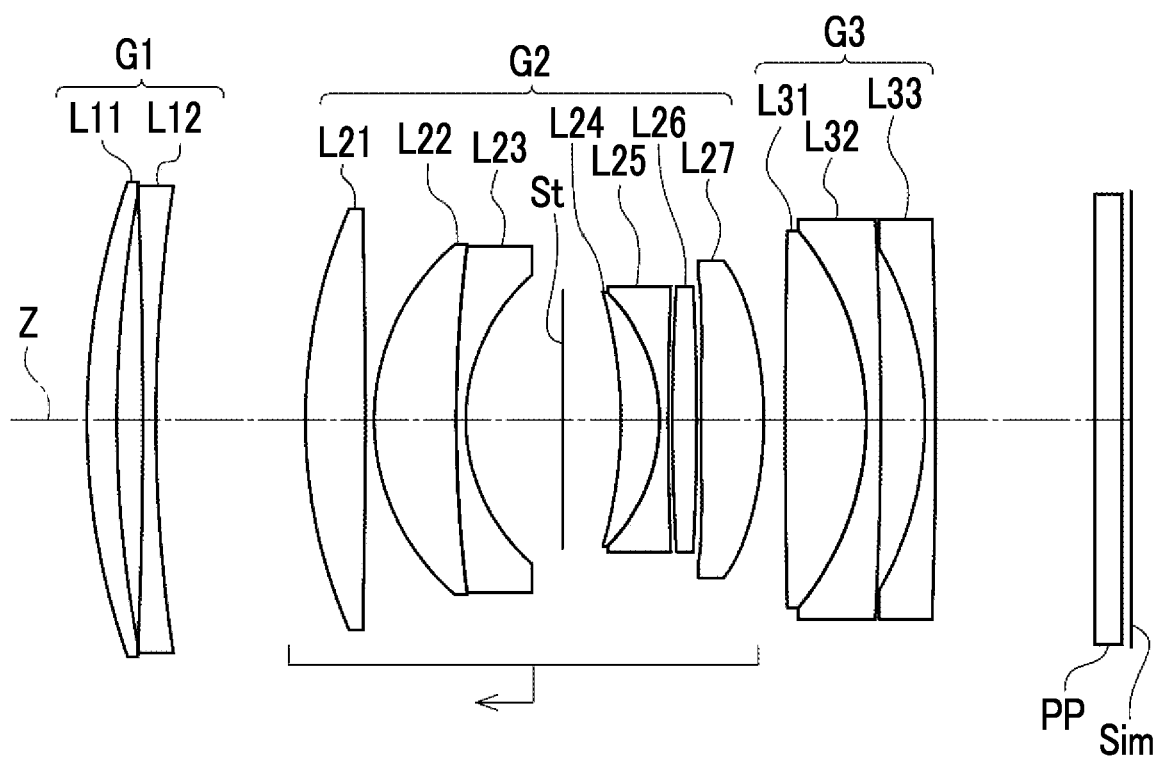
FIG. 8 is a cross-sectional view showing a configuration of an imaging lens of Example 4.
Figure 9:
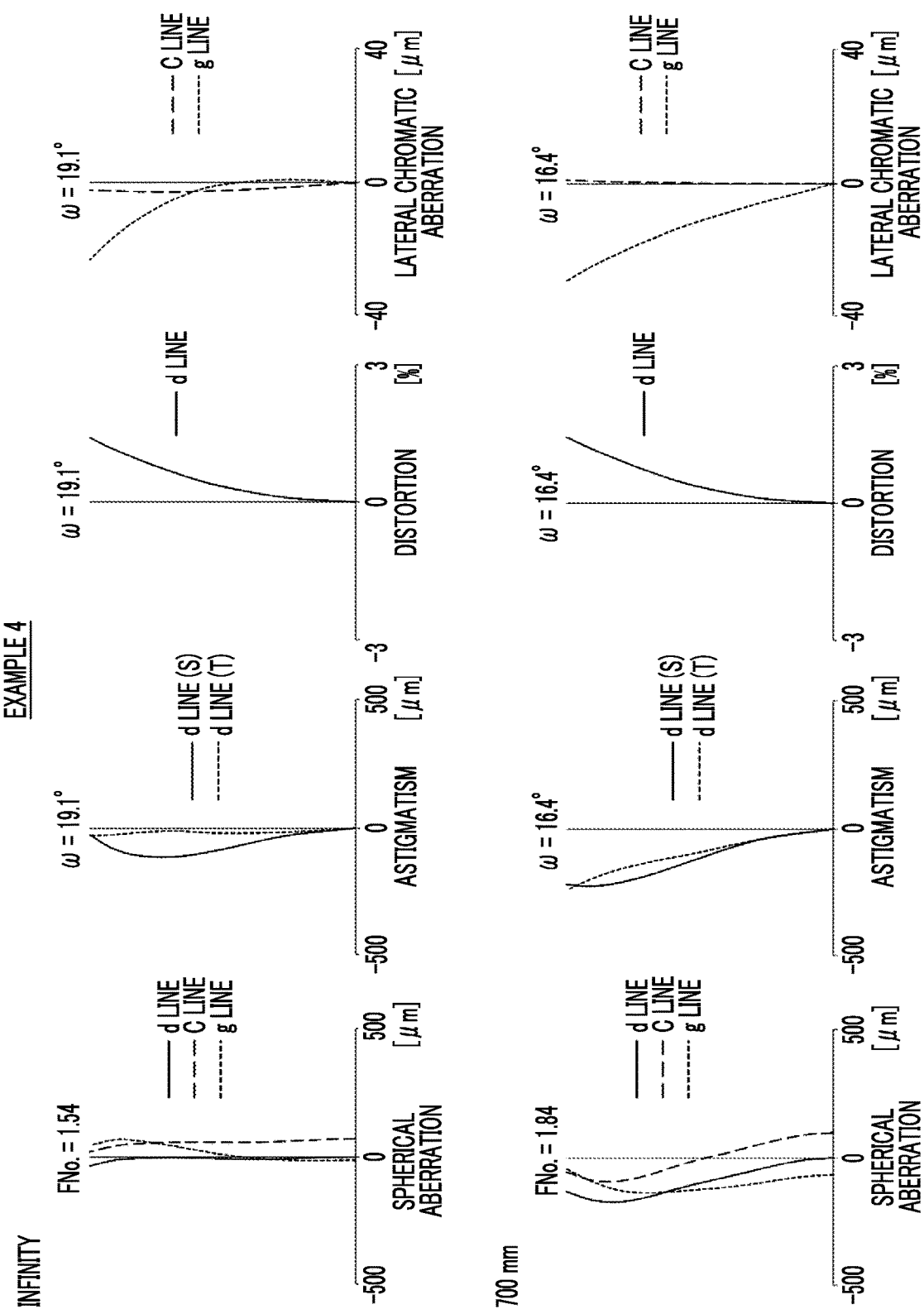
FIG. 9 is a diagram showing aberrations of the imaging lens of Example 4.

FIG. 8 is a cross-sectional view showing a configuration of the imaging lens of Example 4. In the imaging lens of Example 4, the second lens group G2 consists of three lenses including the lens L21 to the lens L23, an aperture stop St, and four lenses including the lens L24 to the lens L27, in order from the object side to the image side. The third lens group G3 consists of three lenses including a lens L31 to a lens L33, in order from the object side to the image side. The imaging lens of Example 4 has the same configuration as the outline of the imaging lens of Example 1 except for the above points. Regarding the imaging lens of Example 4, Table 13 shows basic lens data, Table 14 shows specification, Table 15 shows variable surface distances, Table 16 shows aspheric surface coefficients thereof, and FIG. 9 shows aberration diagrams. FIG. 9 shows aberration diagrams in a state where the object at infinity is in focus in the upper part, and shows aberration diagrams in a state where the object at the object distance of 700 mm (millimeter) is in focus in the lower part.

TABLE 13

Example 4

| Sn | R | D | Nd | νd |
|---|---|---|---|---|
| 1 | 87.3685 | 3.5000 | 2.05090 | 26.94 |
| 2 | 146.8535 | 3.0889 | | |
| 3 | −660.0639 | 1.5300 | 1.71198 | 26.75 |
| 4 | 193.2913 | DD[4] | | |
| *5 | 64.2762 | 7.0498 | 1.74320 | 49.29 |
| *6 | −748.1892 | 0.9999 | | |

TABLE 13-continued

| | Example 4 | | | |
|---|---|---|---|---|
| Sn | R | D | Nd | vd |
| 7 | 28.0125 | 9.6248 | 1.43875 | 94.66 |
| 8 | 170.3378 | 1.1300 | 1.59928 | 31.14 |
| 9 | 23.1318 | 11.3827 | | |
| 10(St) | ∞ | 6.7088 | | |
| 11 | −55.3327 | 4.5189 | 1.43875 | 94.66 |
| 12 | −22.0744 | 1.0100 | 1.51823 | 58.90 |
| 13 | 388.1858 | 0.4998 | | |
| 14 | 266.8384 | 2.8540 | 1.49700 | 81.54 |
| 15 | −302.3940 | 0.5242 | | |
| *16 | 625.1529 | 7.3422 | 1.81000 | 41.00 |
| *17 | −49.2247 | DD[17] | | |
| 18 | 1078.3462 | 9.5000 | 1.88300 | 39.22 |
| 19 | −36.0767 | 1.6900 | 1.59270 | 35.31 |
| 20 | −442.7606 | 5.2185 | | |
| 21 | −41.5086 | 1.2500 | 1.59186 | 38.81 |
| 22 | −678.7198 | 18.6642 | | |
| 23 | ∞ | 3.2000 | 1.51680 | 64.20 |
| 24 | ∞ | 1.0500 | | |

TABLE 14

| Example 4 | |
|---|---|
| f | 77.80 |
| Bf | 21.82 |
| FNo. | 1.54 |
| 2ω(°) | 38.4 |
| Y | 27.35 |
| TL | 121.25 |

TABLE 15

| Example 4 | | |
|---|---|---|
| | DD[4] | DD[17] |
| Infinity | 17.4999 | 2.4999 |
| 700 mm | 6.0508 | 13.9490 |

TABLE 16

| Example 4 | | |
|---|---|---|
| Sn | 5 | 6 |
| KA | 1.0000000E+00 | 1.0000000E+00 |
| A4 | −2.0815738E−07 | 3.1612101E−07 |
| A6 | −2.5618170E−11 | −1.2886119E−10 |
| A8 | −5.3277726E−14 | 2.1204755E−13 |
| A10 | 2.8059174E−16 | 2.0378850E−17 |
| Sn | 16 | 17 |
| KA | 1.0000000E+00 | 1.0000000E+00 |
| A4 | −2.9218701E−06 | −2.2026040E−06 |
| A6 | −9.7250329E−09 | −2.5755732E−09 |
| A8 | 4.9003957E−11 | −3.7951241E−11 |
| A10 | −4.3666590E−13 | 1.2937170E−13 |
| A12 | 1.3227604E−15 | 4.1592996E−17 |
| A14 | 1.5300552E−18 | −3.6707730E−18 |
| A16 | −2.8974079E−20 | 1.4820054E−20 |
| A18 | 8.9812385E−23 | −2.4765310E−23 |
| A20 | −9.8857875E−26 | 1.3042237E−26 |

Table 17 shows the corresponding values of Conditional Expressions (1) to (11) of the imaging lenses of Examples 1 to 4. In Examples 1 to 4, the d line is set as the reference wavelength. Table 17 shows the values based on the d line.

TABLE 17

| Expression Number | Conditional Expression | Example 1 | Example 2 | Example 3 | Example 4 |
|---|---|---|---|---|---|
| (1) | $TL^2/(Y \times f)$ | 6.943 | 6.548 | 6.488 | 6.909 |
| (2) | G1TL/Gsum | 0.092 | 0.084 | 0.100 | 0.069 |
| (3) | N2 | 1.755 | 2.051 | 1.755 | 1.743 |
| (4) | Rc/f22 | −0.415 | −0.477 | −0.384 | −0.560 |
| (5) | f/f1 | 0.097 | 0.197 | 0.154 | 0.034 |
| (6) | f/f21 | 0.587 | 0.359 | 0.546 | 0.686 |
| (7) | f/f22 | 0.797 | 0.946 | 0.803 | 0.787 |
| (8) | |f/f3| | 0.047 | 0.069 | 0.035 | 0.182 |
| (9) | v2p | 94.66 | 94.66 | 94.66 | 94.66 |
| (10) | max(vp-vn) | 62.48 | 66.39 | 62.48 | 63.52 |
| (11) | Bf/f | 0.296 | 0.291 | 0.249 | 0.281 |

The imaging lenses of Examples 1 to 4 are configured to be the inner focus type, have a total optical length shorter than the image size, and have a small size. Further, the imaging lenses of Examples 1 to 4 achieve a high resolution and have high optical performance by satisfactorily correcting various aberrations.

Figure 10:
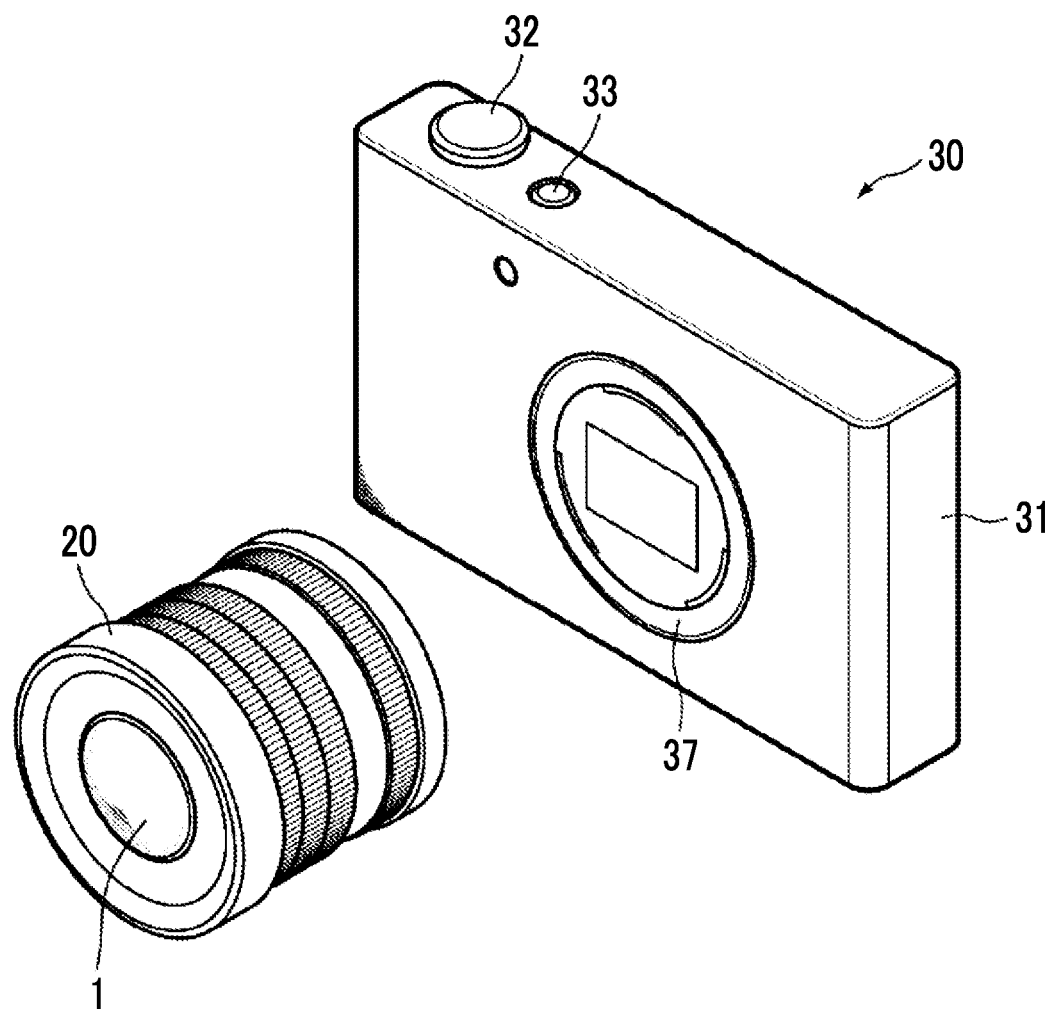
FIG. 10 is a perspective view of the front side of an imaging apparatus according to an embodiment of the present disclosure.
Figure 11:
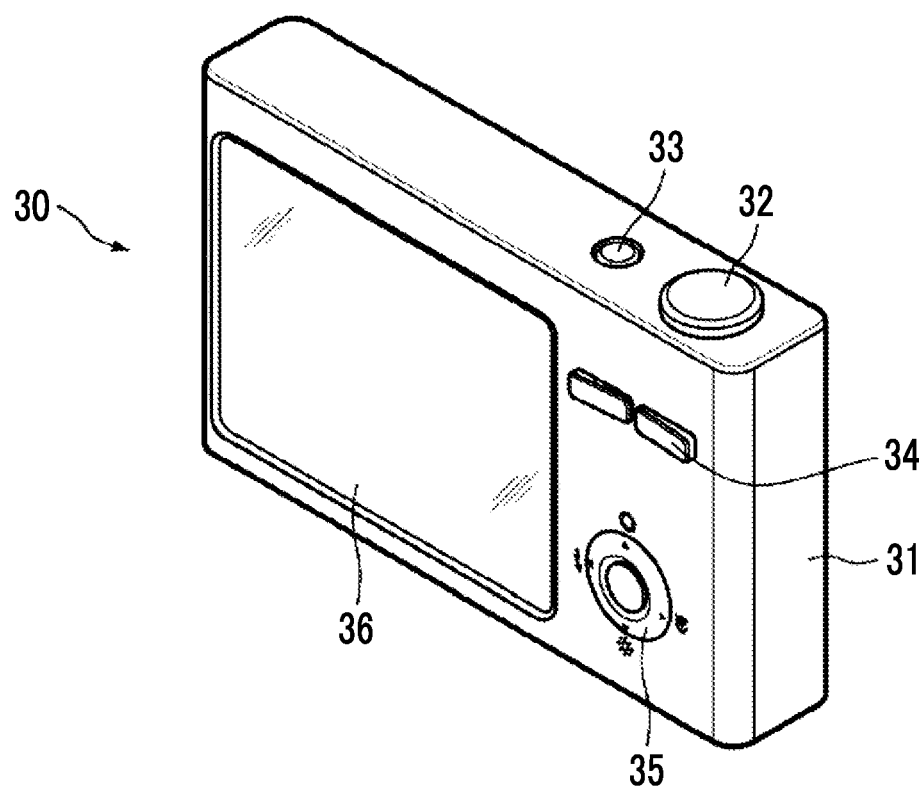
FIG. 11 is a perspective view of the rear side of an imaging apparatus according to an embodiment of the present disclosure.

Next, an imaging apparatus according to an embodiment of the present disclosure will be described. FIGS. 10 and 11 are external views of a camera 30 which is the imaging apparatus according to the embodiment of the present disclosure. FIG. 10 is a perspective view of the camera 30 viewed from the front side, and FIG. 11 is a perspective view of the camera 30 viewed from the rear side. The camera 30 is a so-called mirrorless type digital camera, and the interchangeable lens 20 can be detachably attached thereto. The interchangeable lens 20 is configured to include the imaging lens 1, which is housed in a lens barrel, according to an embodiment of the present disclosure.

The camera 30 comprises a camera body 31, and a shutter button 32 and a power button 33 are provided on an upper surface of the camera body 31. Further, an operation section 34, an operation section 35, and a display section 36 are provided on a rear surface of the camera body 31. The display section 36 is able to display a captured image and an image within an angle of view before imaging.

An imaging aperture, through which light from an imaging target is incident, is provided at the center on the front surface of the camera body 31. A mount 37 is provided at a position corresponding to the imaging aperture. The interchangeable lens 20 is mounted on the camera body 31 with the mount 37 interposed therebetween.

In the camera body 31, there are provided an imaging element, a signal processing circuit, a storage medium, and the like. The imaging element such as a charge coupled device (CCD) or a complementary metal oxide semiconductor (CMOS) outputs a captured image signal based on a subject image which is formed through the interchangeable lens 20. The signal processing circuit generates an image through processing of the captured image signal which is output from the imaging element. The storage medium stores the generated image. The camera 30 is able to capture a still image or a video by pressing the shutter button 32, and is able to store image data, which is obtained through imaging, in the storage medium.

The technology of the present disclosure has been hitherto described through embodiments and examples, but the technology of the present disclosure is not limited to the above-mentioned embodiments and examples, and may be modified into various forms. For example, values such as the radius of curvature, the surface distance, the refractive index, the Abbe number, and the aspheric surface coefficient of each lens are not limited to the values shown in the examples, and different values may be used therefor.

Further, the imaging apparatus according to the embodiment of the present disclosure is not limited to the above example, and may be modified into various forms such as a camera other than the mirrorless type, a film camera, and a video camera.

What is claimed is:

1. An imaging lens consisting of, in order from an object side to an image side: a first lens group having a positive refractive power; a second lens group having a positive refractive power; and a third lens group,
   wherein during focusing from an object at infinity to a closest object, only the second lens group moves,
   the second lens group includes at least four lenses and a stop, and
   assuming that
      a sum of a distance on an optical axis from a lens surface closest to the object side in the first lens group to a lens surface closest to the image side in the third lens group and a back focal length of the imaging lens at an air conversion distance is TL,
      a maximum image height is Y, and
      a focal length of the imaging lens in a state where the object at infinity is in focus is f,
      Conditional Expression (1) is satisfied, which is represented by $4 < TL^2/(Y \times f) < 7.5$       (1), wherein the second lens group includes at least one lens arranged on the image side of the stop, and
   assuming that
      a combined focal length of all lenses in the second lens group closer to the image side than the stop is f22,
      Conditional Expression (7-2) is satisfied, which is represented by $0.4 < f/f22 < 1.2$       (7-2), wherein the second lens group includes at least one lens arranged on the object side of the stop, and
   an image side surface of a lens adjacent to the object side of the stop is a concave surface,
   wherein assuming that
      a radius of curvature of an object side surface of the lens adjacent to the image side of the stop is Rc,
      Conditional Expression (4) is satisfied, which is represented by $-0.7 < Rc/f22 < -0.1$       (4), and wherein a cemented lens, in which a positive lens and a negative lens are cemented in order from the object side to the image side, is arranged adjacent to the object side of the stop.

2. The imaging lens according to claim 1, wherein the first lens group includes at least one positive lens and at least one negative lens.

3. The imaging lens according to claim 1, wherein the third lens group includes at least three lenses.

4. The imaging lens according to claim 1, wherein an object side surface of a lens closest to the image side in the third lens group is a concave surface.

5. The imaging lens according to claim 4, wherein a lens closest to the image side in the third lens group is a negative lens.

6. The imaging lens according to claim 1, wherein a lens closest to the object side in the second lens group is a positive lens.

7. The imaging lens according to claim 6, wherein assuming that
      a refractive index of the positive lens closest to the object side in the second lens group based at a d line is N2,
      Conditional Expression (3) is satisfied, which is represented by $1.6 < N2 < 2.2$       (3).

8. The imaging lens according to claim 1, wherein assuming that
      a focal length of the first lens group is f1,
      Conditional Expression (5) is satisfied, which is represented by $0.02 < f/f1 < 0.3$       (5).

9. The imaging lens according to claim 1,
   wherein assuming that
      a combined focal length of all lenses in the second lens group closer to the object side than the stop is f21,
      Conditional Expression (6) is satisfied, which is represented by $0.2 < f/f21 < 1$       (6).

10. The imaging lens according to claim 1, wherein assuming that
      a focal length of the third lens group is f3,
      Conditional Expression (8) is satisfied, which is represented by $0 < |f/f3| < 0.3$       (8).

11. The imaging lens according to claim 1,
   wherein the second lens group includes at least one positive lens, and
   assuming that an Abbe number of the positive lens of the second lens group based on a d line is ν2p,
   Conditional Expression (9) is satisfied, which is represented by $70 < \nu 2p$       (9).

12. The imaging lens according to claim 11,
   wherein the second lens group includes at least two sets of cemented lenses each consisting of one positive lens and one negative lens, and
   at least the positive lenses of the two sets of the cemented lenses in the second lens group satisfy Conditional Expression (9).

13. The imaging lens according to claim 12, wherein assuming that
      Abbe numbers of the positive lenses and the negative lenses of the cemented lenses of the second lens group, which are cemented to each other, based on the d line are νp and νn, and
      a maximum value of a difference obtained by subtracting νn from νp is max(νp−νn),
      Conditional Expression (10) is satisfied, which is represented by $30 < \max(\nu p - \nu n) < 75$       (10).

14. The imaging lens according to claim 1, wherein an object side surface of a lens closest to the object side in the second lens group is a convex surface.

15. The imaging lens according to claim 1, wherein assuming that
      a back focal length of the imaging lens at the air conversion distance is Bf, Conditional Expression (11) is satisfied, which is represented by $$0.1 < Bf/f < 0.5 \quad (11).$$

16. An imaging apparatus comprising the imaging lens according to claim 1.

* * * * *